Dec. 1, 1925.  1,563,343
H. W. COOLEY
WINDSHIELD HINGE
Filed Dec. 10, 1923
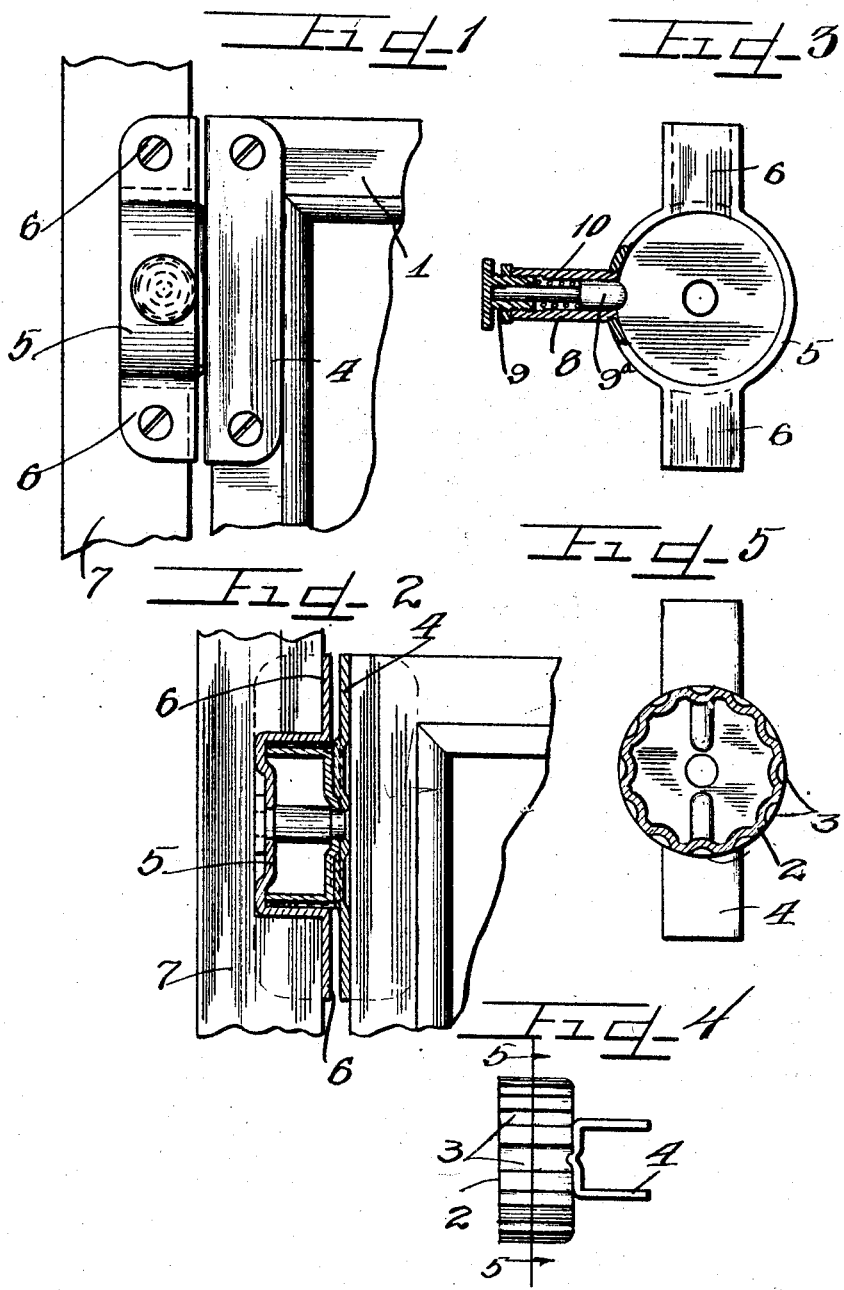

Patented Dec. 1, 1925.

1,563,343

UNITED STATES PATENT OFFICE.

HIRAM W. COOLEY, OF CHICAGO, ILLINOIS, ASSIGNOR TO WILLIAM R. MOSS, OF CHICAGO, ILLINOIS.

WINDSHIELD HINGE.

Application filed December 10, 1923. Serial No. 679,577.

*To all whom it may concern:*

Be it known that I, HIRAM W. COOLEY, a citizen of the United States, and a resident of the city of Chicago, in the county of Cook and State of Illinois, have invented certain new and useful Improvements in a Windshield Hinge; and I do hereby declare that the following is a full, clear, and exact description of the same, reference being had to the accompanying drawings, and to the numerals of reference marked thereon, which form a part of this specification.

This invention relates to a hinge primarily adapted for supporting wind shields upon automotive vehicles, but susceptible of use wherever it is desired to revolubly support a member, the movements of which it is desired to control and limit.

It is an object of this invention to provide a revoluble hinge connection for a rotatable member which is designed to retain said rotatable member in any desired adjusted position, and which is simple and easily installed.

With these and other objects in view, which will become more apparent in the following description and disclosures, this invention comprises the novel structure and combinations hereinafter described and more particularly pointed out in the appended claims.

In the accompanying drawings, which illustrate a preferred embodiment of this invention and in which similar reference numerals refer to similar features in the different views.

Fig. 1 is a fragmentary elevational view of a wind shield and its support.

Fig. 2 is a view similar to Fig. 1 with parts shown in section.

Fig. 3 is an interior plan view of the supporting bearing for the wind shield, showing a spring detent barrel in section.

Fig. 4 is an elevational view of the supporting trunnion on the wind shield that forms the revoluble hinge connection.

Fig. 5 is a section upon the line 5—5 of Fig. 4.

In the drawing there is illustrated the rotatable hinge connection upon one side of a rotatable member such as a wind shield, but it should be understood that a similar connection may be used upon the opposite side thereof, if so desired. As the same are duplicates, only one has been illustrated.

The rotatable hinge connection is in the form of a cylindrical trunnion 2 having detent receiving depressions 3 in its circumferential surface. This trunnion 2 is closed at its inner end, which has the web of a channel member 4 secured thereto. The two flanges of the channel member are sufficiently spaced apart to receive the edge of the wind shield therebetween. After the lateral edge of the wind shield has been thuswise inserted between the flanges of the channel member, it may be secured therein by screws or the like.

Proper bearings have been provided for forming a cylindrical bearing socket for supporting the trunnions. Such a bearing socket is shown in Fig. 3. It comprises a cylindrical socket 5 having diametrically opposite attaching extensions 6 which are in the form of channel members adapted to fit over the side frame member 7 of the wind shield supporting rack or frame and be secured thereto by screws or the like; a recess being provided in the frame 7 for receiving the bearing socket. If desired the bearing socket may form an integral part of the wind shield support. A barrel 8 is threaded into this bearing socket and communicates with the interior thereof. A retaining cap or plug 9 is threaded interiorly of the barrel and is adjustable relative thereto. A plunger 9ª having an inner rounded end and an outer reduced shank is confined within said barrel, and is normally spring impelled to engage the depression in the trunnions by means of a coil spring 10 surrounding the reduced shank and abutting the plug 9 and the shoulder formed at the inner end of the reduced shank.

One way of assembling the wind shield with relation to the supporting frame members 7 may be suggested. It consists in first securing the bearing sockets in the side frame members, inserting the trunnions therein which may be turned to any convenient angle, and then sliding the wind shield between the channel members 4 and attaching the same by screws or the like.

It is evident that the wind shield may be readily adjusted to any desired angle by properly rotating the same. The yielding detent will readily yield during such rotation. When the desired angle has been reached, the detent will automatically snap into one of the depressions of the trunnions when the same is in an opposite position. Otherwise, the wind shield may be moved a trifle to allow the detent to engage a depression as is obvious. These detents will positively hold the wind shield from shifting during any rattling of the car over rough roads, and are more reliable than the plain friction holding means as commonly used.

While I have illustrated the particular rotatable hinge connection in relation with a wind shield, it should be understood that it is not limited thereto but may be used on rotating windows, shutters or doors or similar rotatable members.

I am aware that numerous details of construction may be varied through a wide range without departing from the principles of this invention, and I therefore do not purpose limiting the patent granted otherwise than necessitated by the prior art.

I claim as my invention:

1. In a device of the class described, a frame having a recess, a detachable socket mounted in said recess and having channel-like extensions secured to said frame, a barrel member threaded into said socket and provided with a threaded closure member, a yielding detent contained in said barrel, and a trunnion rotatable in said socket and having a channel member adapted for receiving a member, said trunnion having depressions engageable by said detent.

2. In a device of the class described, a frame having a recess, a socket mounted in said recess and having channel like extensions secured to said frame, a yielding detent supported in the wall of said socket, and a trunnion rotatable in said socket and having a channel member adapted for receiving a member, said trunnion having depressions engageable by said detent.

In testimony whereof I have hereunto subscribed my name.

HIRAM W. COOLEY.